United States Patent
Tang et al.

(10) Patent No.: US 10,977,297 B1
(45) Date of Patent: Apr. 13, 2021

(54) EPHEMERAL ITEM RANKING IN A GRAPHICAL USER INTERFACE

(71) Applicant: Facebook, Inc., Menlo Park, CA (US)

(72) Inventors: Lijun Tang, San Jose, CA (US); Xingyao Ye, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 23 days.

(21) Appl. No.: 16/218,134

(22) Filed: Dec. 12, 2018

(51) Int. Cl.
*G06F 16/44* (2019.01)
*G06F 16/438* (2019.01)
*G06F 16/48* (2019.01)
*G06N 20/00* (2019.01)
*G06K 9/62* (2006.01)
*G06Q 50/00* (2012.01)

(52) U.S. Cl.
CPC ........ *G06F 16/447* (2019.01); *G06F 16/4393* (2019.01); *G06F 16/489* (2019.01); *G06K 9/6256* (2013.01); *G06N 20/00* (2019.01); *G06Q 50/01* (2013.01)

(58) Field of Classification Search
CPC .. G06F 16/447; G06F 16/4394; G06F 16/489; G06N 20/00; G06K 9/6256; G06Q 50/01
See application file for complete search history.

(56) References Cited

U.S. PATENT DOCUMENTS

| | | | |
|---|---|---|---|
| 8,768,863 B2 * | 7/2014 | Gubin | G06N 20/00 706/12 |
| 9,129,227 B1 * | 9/2015 | Yee | G06F 16/248 |
| 10,460,247 B2 * | 10/2019 | Swaminathan | G06F 16/48 |
| 10,581,953 B1 * | 3/2020 | Brewer | G06N 7/005 |
| 2010/0153315 A1 * | 6/2010 | Gao | G06F 16/24578 706/12 |
| 2010/0250523 A1 * | 9/2010 | Jin | G06F 16/951 707/723 |
| 2012/0150854 A1 * | 6/2012 | Song | G06F 16/9558 707/728 |

(Continued)

OTHER PUBLICATIONS

Li et al. "McRank: Learning to Rank Using Multiple Classification and Gradient Boosting," Advances in neural information processing systems. 2008. (Year: 2008).*

(Continued)

*Primary Examiner* — Andrew T Chiusano
(74) *Attorney, Agent, or Firm* — Fenwick & West LLP

(57) ABSTRACT

An online system causes a graphical user interface to display at a client device. The graphical user interface includes a story field that displays ephemeral content items which are created within a threshold time period and are automatically removed after the time period. The online system uses a computer learned model to rank the selected ephemeral content items for display. The display of a set of ephemeral content items is associated with a session. The computer learned model is trained with sample sets that use an entire past session that includes a plurality of ephemeral content items. The computer model proposes a ranked order of the content items in the past session. Based on the past user actions performed on the past content items, a normalized discounted cumulative gain is determined for the past session. The computer model is trained to optimize the normalized discounted cumulative gain.

20 Claims, 7 Drawing Sheets

(56) References Cited

U.S. PATENT DOCUMENTS

| | | | | |
|---|---|---|---|---|
| 2015/0363688 | A1* | 12/2015 | Gao | G06N 3/082 |
| | | | | 706/27 |
| 2016/0283488 | A1* | 9/2016 | Sankar | G06Q 50/01 |
| 2017/0004454 | A1* | 1/2017 | Tang | G06F 16/9535 |
| 2017/0308537 | A1* | 10/2017 | Yi | G06F 16/4387 |
| 2018/0034818 | A1* | 2/2018 | Choi | G06F 3/04883 |
| 2018/0075146 | A1* | 3/2018 | Petrescu | G06F 16/9535 |
| 2018/0287979 | A1* | 10/2018 | Dimson | G06Q 50/01 |
| 2018/0295092 | A1* | 10/2018 | Peiris | H04L 51/32 |
| 2018/0373794 | A1* | 12/2018 | Dimson | G06N 7/005 |
| 2019/0129958 | A1* | 5/2019 | Liao | G06N 20/00 |
| 2019/0147056 | A1* | 5/2019 | Gordon | G06N 20/20 |
| | | | | 707/748 |
| 2019/0147057 | A1* | 5/2019 | Gordon | G06N 20/00 |
| | | | | 707/748 |
| 2019/0147112 | A1* | 5/2019 | Gordon | G06F 16/90335 |
| | | | | 706/12 |
| 2019/0188320 | A1* | 6/2019 | Gordon | G06Q 50/01 |
| 2019/0295105 | A1* | 9/2019 | Sharma | G06Q 30/0203 |

OTHER PUBLICATIONS

Zheng, Zhaohui, et al. "A regression framework for learning ranking functions using relative relevance judgments." Proceedings of the 30th annual international ACM SIGIR conference on Research and development in information retrieval. 2007. (Year: 2007).*

Jankiewicz, Paweł, et al. "Boosting algorithms for a session-based, context-aware recommender system in an online travel domain." Proceedings of the Workshop on ACM Recommender Systems Challenge. 2019. (Year: 2019).*

Zhu, Guangyu, and Gilad Mishne. "ClickRank: Learning session-context models to enrich web search ranking." ACM Transactions on the Web (TWEB) 6.1 (2012): 1-22. (Year: 2012).*

Li, Ping, Qiang Wu, and Christopher J. Burges. "Mcrank: Learning to rank using multiple classification and gradient boosting." Advances in neural information processing systems. 2008. (Year: 2008).*

Burges, Christopher J.C., "From RankNet to LambdaRank to LambdaMART: An Overview", Microsoft Research Technical Report MSR-TR-2010-82, 2010, pp. 1-19.

* cited by examiner

Past Session – Session ID 00002341

| Past Content Items | Past User Action | Relevance Label | Position Gain Score |
|---|---|---|---|
| Past Content Item 1 | Tap | 2 | 3 |
| Past Content Item 2 | Close | 0 | 0 |
| Past Content Item 3 | Create | 4 | 15 |
| Past Content Item 4 | View | 1 | 1 |
| Past Content Item 5 | Reply | 3 | 7 |

410

Computer Model
400

FIG. 4

EPHEMERAL ITEM RANKING IN A GRAPHICAL USER INTERFACE

BACKGROUND

This invention generally relates to ranking and arrangement of items in a graphical user interface, and in particular to ranking of ephemeral items that are displayed in a graphical user interface using a computer learned model that is optimized for normalized discounted cumulative gain.

One of the challenges of graphical user interface (GUI) of mobile devices with small screens is to allow users to access content items presented in the GUI quickly and efficiently. A mobile device with a small screen tends to be able to present only a limited number of graphical elements and content items. In the context of GUI provided by an online system such as a social networking system, a successful arrangement of graphical elements and content items should promote the user's interaction with other users and content items presented in the online system. As a result, a high-quality GUI often displays content items that are most relevant to the viewing users more prominently. This often involves ranking of content items relative to each other in order to display content items that are determined as most relevant first in the limited space of the GUI. However, conventionally the determination of whether a content item is more relevant than other content items is often a difficult task, which may involve a labor-intensive process that manually assigns a relevance label to each content item. The process is slow and expensive and is not suitable for content items that are fast changing.

SUMMARY

Embodiments in this disclosure are related to ranking of ephemeral items that are available in an online system for a short period of time. The ephemeral items may be ephemeral content items such as stories created by users of the online system. The ephemeral items are displayed in a ranked order in a story field of a graphical user interface. The ephemeral items are only available for to be viewed by other users for a limited period (e.g., 24 hours) and will disappear after the ephemeral items have expired. Hence, the accurate ranking of those ephemeral items by relevance and user's preference to ensure the most relevant items are displayed first in a limited space of the story field is important for the operation and optimization of the GUI.

In accordance with an embodiment, the online system uses a computer model to rank a selected set of ephemeral content items to determine a proper ranked order of items that promote the accessibility of the GUI. The computer model is trained with a plurality of sample sets of past sessions of ordered ephemeral content items. The content items in each sample set are associated with past user actions performed on the content items. Based on the past user action, a relevance label is assigned to each content item. For example, a content item associated with a user response (e.g., a comment on the content item) is assigned a higher value of relevance label than a content item with a user action that is associated with only viewing the content item. Also, each sample set may include an entire past session that includes a plurality of past content items that are displayed together in the session. Since the story field that displays the ephemeral content items has a limited space in the GUI, a viewing user often treats items in the story field as a collective unit. As such, treating a past session as a single sample set improves the performance of the computer model and the optimization of the GUI.

Since the past session that includes multiple past content items is used as a sample set instead of each content item being treated as an individual training sample, a metric based on a ranking of multiple content items may be used to optimize the performance of the computer model. The metric may also be referred to as a normalized discounted cumulative gain. For a given sample set of a past session, the online system assigns each content item with a relevance label based on past user action. The relevance label may be converted to a position gain score.

During training, the computer model may propose a ranked order of a past session based on attributes of the content items and compare the proposed ranked order to the actual past user actions performed on the content items. Specifically, when a proposed ranked order is determined, the gain score of each past content item is discounted based on the position of the content item in the proposed ranked order. For example, the gain score of a content item that is ranked higher is discounted less than that of another content item that is ranked lower. After each gain score is discounted, the computer model determines a discounted cumulative gain by summing the discounted gain scores of different content items. Also, the computer model determines an ideal discounted cumulative gain, which represents a ranked order that results in the maximum discounted cumulative gain. The computer model normalizes the discounted cumulative gain based on the ideal discounted cumulative gain. A high normalized value indicates that the computer model successfully ranks the content items in the session in a way that is consistent with the past user actions performed on the content items. A low normalized value indicates that the computer model might need to be adjusted to better predict a ranking that promotes user interactions with the content items. The computer model may be trained by optimizing the overall normalized discounted cumulative gain across different sample sets.

After the computer model is sufficiently trained, it may be used to rank ephemeral content items in a new session. The display and ranking process of items in the new session may include receiving a request to display a graphical user interface of an online system at a mobile device. The graphical user interface includes a story field of a limited space for holding content items. The process may also include receiving a request for a session to display content items in the story field. In turn, the online system selects a set of ephemeral content items for the session. Each selected ephemeral content item is created within a threshold time period from the request. The online system determines, for each ephemeral content item in the set, a ranking score based on attributes of the ephemeral content item using the computer model. The process may further include determining a ranked order of the ephemeral content items in the set in accordance with the ranking score of each ephemeral content item. After the ranked order is determined, the online system may present the set of ephemeral content items in the story field of the graphical user interface in the ranked order for a duration of the session not exceeding the threshold time period.

BRIEF DESCRIPTION OF THE DRAWINGS

FIG. 4 illustrates a generation of training sample sets for a computer ranking model, in accordance with an embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overall System Environment

Figure 1:
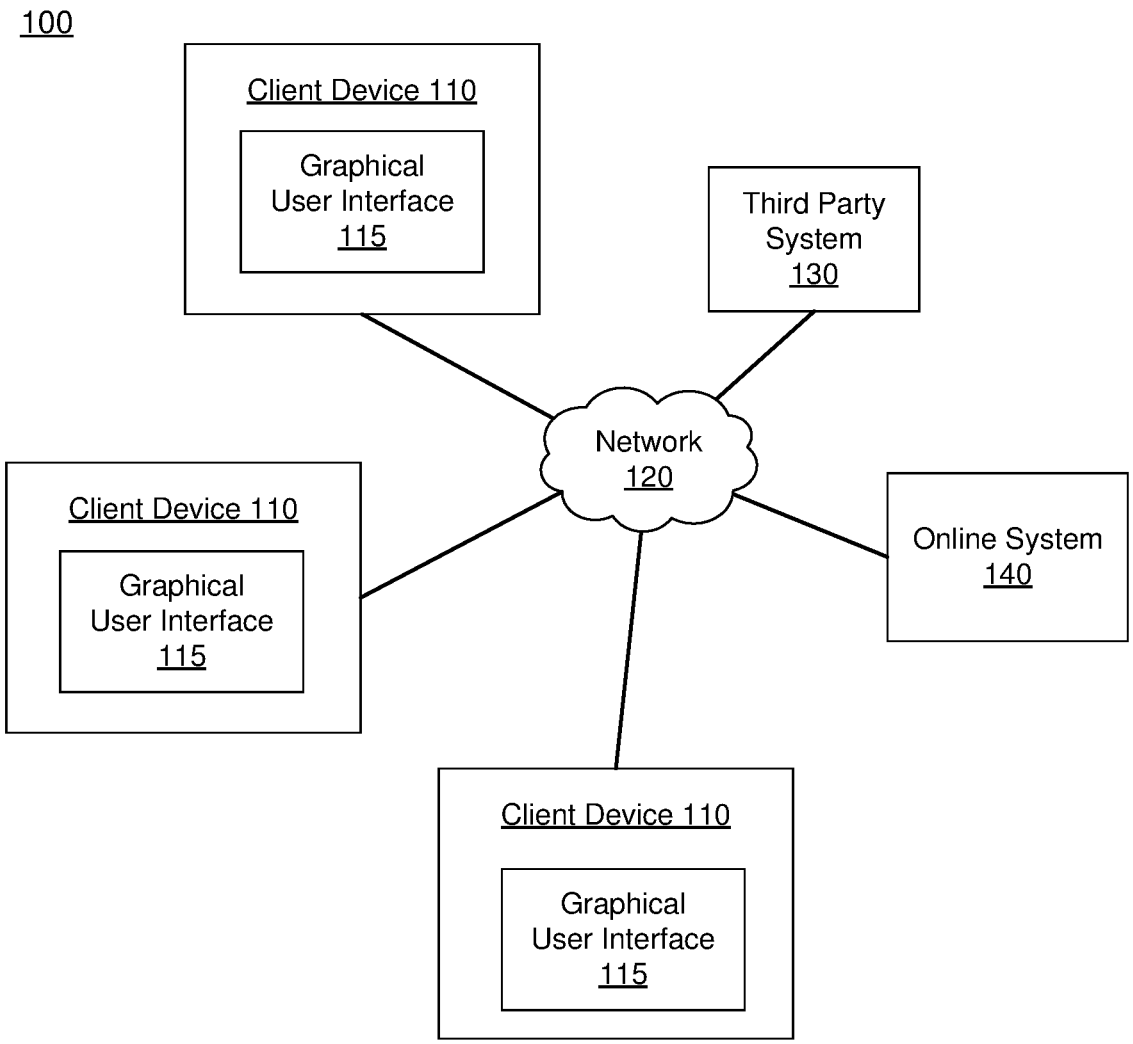
FIG. 1 is a block diagram of a system environment for an online system.

FIG. 1 is a block diagram of a system environment 100 for an online system 140. The system environment 100 shown by FIG. 1 comprises one or more client devices 110, a network 120, one or more third-party systems 130, and the online system 140. Different and/or additional components may be included in the system environment 100. The online system 140 may also be referred to as a social networking system, a content sharing network, or a system providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, or another suitable device. The client devices 110 may also be referred to as mobile devices. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

Each client device 110 can display one or more graphical user interfaces 115 (GUIs) provided to facilitate interactions between users and the client device 110. Each client device 110 may include several different GUIs that may take different forms. By way of example, a GUI 115 includes graphical elements of a software application that is installed on a client device. In another example, a GUI 115 is a visual content of a website of an online system that is displayed in a browser application. A GUI 115 may be controlled by the client device 110 or may be controlled by the online system 140 that causes the client device 110 to display various graphical elements when the client device 110 or the online system 140 receives a request to display the GUI 115. For example, the GUI 115 is a user interface of a social networking system that is displayed at a mobile device. When a client such as an end user starts a software application that is published and controlled by the online system 140 at his/her client device 110 or visits the web address of the online system 140, the online system 140 receives a request to display a GUI 110. In turn, the online system 140 provides or cooperates with the client device 110 to provide the content items and graphical elements of the GUI 115 to be displayed at the client device 110.

One or more third-party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device 110. In other embodiments, a third party system 130 provides content or other information for presentation via a client device 110. A third party system 130 may also communicate information to the online system 140, such as content, data, or information about an application provided by the third party system 130.

Online System Architecture

Figure 2:
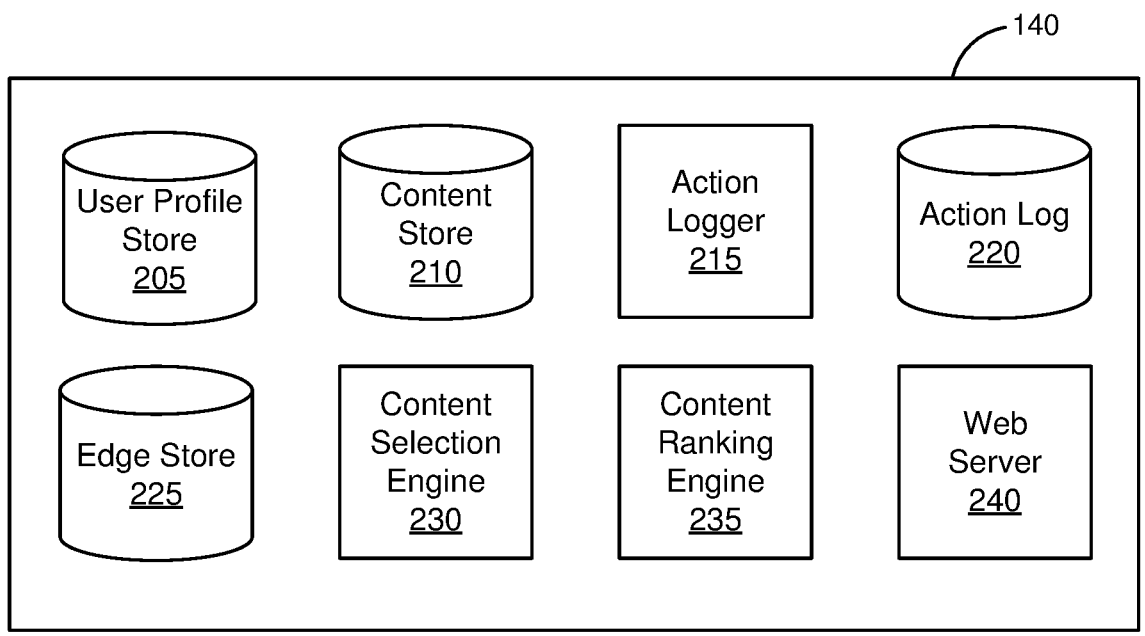
FIG. 2 is a block diagram of an example architecture of the online system illustrated in FIG. 1.

FIG. 2 is a block diagram of an example architecture of the online system 140. The online system 140 shown in FIG. 2 includes a user profile store 205, a content store 210, an action logger 215, an action log 220, an edge store 225, a content selection engine 230, a content ranking engine 235, and a web server 240. In other embodiments, the online system 140 may include additional, fewer, or different components for various applications. Conventional components such as network interfaces, security functions, load balancers, failover servers, management and network operations consoles, and the like are not shown.

The users of the online system 140, including individual users and other users such as associations, companies, or other entities, may each be associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 220.

While user profiles in the user profile store 205 are frequently associated with individuals, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores content items, which can take the form of database objects that each represent various types of content. Examples of a content item represented by an object include a page post, a status update, a photograph, a video, a link, a shared content item, a gaming application achievement, a check-in event at a local business, a brand page, or any other type of content. Content items may also include sponsored items such as advertisements. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

In various embodiments, a content item includes various components capable of being identified and retrieved by the online system 140. Example components of a content item include: a title, text data, image data, audio data, video data, a landing page, a user associated with the content item, or any other suitable information. The online system 140 may retrieve one or more specific components of a content item for presentation in some embodiments. For example, the online system 140 may identify a title and an image from a content item and provide the title and the image for presentation rather than the content item in its entirety.

One or more content items included in the content store 210 include a creative, which could be a sponsored content item for presentation to a user, and a bid amount. The creative is text, image, audio, video, or any other suitable data presented to a user. In various embodiments, the creative also specifies a page of content. For example, a content item includes a link that specifying a network address of a landing page of content to which a user is directed when the content item is accessed. The bid amount is included in a content item by a user and is used to determine an expected value, such as monetary compensation, provided by a sponsor to the online system 140 if content in the content item is presented to a user, if the content in the content item receives a user interaction when presented, or if any suitable condition is satisfied when content in the content item is presented to a user. For example, the bid amount included in a content item specifies a monetary amount that the online system 140 receives from a user who provided the content item to the online system 140 if the content item is displayed. In some embodiments, the expected value to the online system 140 of presenting the content from the content item may be determined by multiplying the bid amount by a probability of the content of the content item being accessed by a user.

Various content items may include an objective identifying an interaction that a user associated with a content item desires other users to perform when presented with content included in the content item. Example objectives include: installing an application associated with a content item, indicating a preference for a content item, sharing a content item with other users, interacting with an object associated with a content item, or performing any other suitable interaction. As content from a content item is presented to online system users, the online system 140 logs interactions between users presented with the content item or with objects associated with the content item.

Additionally, a content item may include one or more targeting criteria specified by the content provider who provided the content item to the online system 140. Targeting criteria included in a content item request specify one or more characteristics of users eligible to be presented with the content item. For example, targeting criteria are used to identify users having user profile information, edges, or actions satisfying at least one of the targeting criteria. Hence, targeting criteria allow a user to identify users having specific characteristics, simplifying subsequent distribution of content to different users. For example, the targeting criteria may be used to determine the selection of users for the presentation of sponsored content items.

In one embodiment, targeting criteria may specify actions or types of connections between a user and another user or object of the online system 140. Targeting criteria may also specify interactions between a user and objects performed external to the online system 140, such as on a third party system 130. For example, targeting criteria identifies users that have taken a particular action, such as sent a message to another user, used an application, joined a group, left a group, joined an event, generated an event description, purchased or reviewed a product or service using an online marketplace, requested information from a third party system 130, installed an application, or performed any other suitable action. Including actions in targeting criteria allows users to further refine users eligible to be presented with content items. As another example, targeting criteria identifies users having a connection to another user or object or having a particular type of connection to another user or object.

Content items include ephemeral content items that are associated with a threshold time period. Those content items are ephemeral in nature because the content items are removed from other users after the threshold time period. For example, a content item that is not ephemeral may stay on a user's profile, content page, or news feed for an indefinite period of time until some conditions trigger the removal of the content item. The conditions may include a content creator's affirmative removal of the content item from a profile or a content page or a viewing user unsubscribing or deleting the content item in his/her news feed. In contrast, an ephemeral content item is removed automatically after the threshold time period. For example, the online system 140 may set the threshold time period to 24 hours. After the expiration of the ephemeral content item, the ephemeral content item will be removed from the creator's profile and content page, and will no longer be displayed or searchable in other users' content feed, story tray, or profiles. In one case, access to the ephemeral content item is no longer allowed for any users after the threshold time period. In another case, the creators of the ephemeral content items are allowed to archive their own ephemeral content items while other users are prevented from searching, retrieving, sharing, storing, or displaying the ephemeral content items.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third-party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The edge store 225 stores information describing connections between users and other objects on the online system 140 as edges. Some edges may be defined by users, allowing users to specify their relationships with other users. Edges may represent a connection of a node (which could represent a user, an object, an entity, etc.) in a social graph. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140. Each user or object can be represented as a node in the social network and the nodes are connected to each other via edges. In one embodiment, the nodes and edges form a complex social network of connections indicating how users and/or objects are related or connected to each other (e.g., one user accepted a friend request from another user to become connections in the social network) and how a user is connected to an object due to the user interacting with the object in some manner (e.g., "liking" a page object, joining an event object or a group object, etc.). Objects can also be connected to each other based on the objects being related or having some interaction between them.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 305, or the user profile store 305 may access the edge store 225 to determine connections between users.

The content selection engine 230 and the content ranking engine 235 cooperate to cause presentation of various content items at client devices 110. For example, the content selection engine 230 and the content ranking engine 235 cause the population of content items at various fields of a GUI 115 of the client device 110. The content selection engine 230 may first select a certain number of content items up to a limit for presentation. Based on the selected content items, the content ranking engine 235 ranks the content items to determine the order of presentation of the content items. A GUI 115 may include multiple fields that need to be populated with content items. Those fields may include a story field that displays ephemeral content items that may be referred to as stories. Other example fields may also include a newsfeed, a sponsored item slot, and other different feeds that are used to present content.

The content selection engine 230 selects one or more content items to be displayed in a GUI 115 of a client device 110. Content items eligible for presentation to the user are retrieved from the content store 210 or from another source by the content selection engine 230, which selects one or more of the content items for presentation to the viewing user. A content item eligible for presentation to the user is a content item associated with at least a threshold number of selection criteria satisfied by characteristics of the user. The selection criteria may be based on the viewing user's and the creating user's profiles, affinity, edges, and the content items' attributes and characteristics. The selection criteria may also include targeting criteria for certain sponsored content items. In various embodiments, the content selection engine 230 includes content items eligible for presentation to the user in one or more selection processes, which identify a set of content items for presentation to the user. For example, the content selection engine 230 determines measures of relevance of various content items to the user based on attributes associated with the user by the online system 140 and based on the user's affinity for different content items.

In some cases, content items eligible for presentation to the user may include content items associated with bid amounts. The content selection engine 230 uses the bid amounts associated with content items when selecting content for presentation to the user. In various embodiments, the content selection engine 230 determines an expected value associated with various content items based on their bid amounts and selects content items associated with a maximum expected value or associated with at least a threshold expected value for the presentation. An expected value associated with a content item represents an expected amount of compensation to the online system 140 for presenting the content item. For example, the expected value associated with a content item is a product of the content item's bid amount and a likelihood of the user interacting with the content item. The content selection engine 230 may rank content items based on their associated bid amounts and select content items having at least a threshold position in the ranking for presentation to the user. In some embodiments, the content selection engine 230 ranks both content items not associated with bid amounts and content items associated with bid amounts in a unified ranking based on bid amounts and measures of relevance associated with content items. Based on the unified ranking, the content selection engine 230 selects content for presentation to the user. Selecting content items associated with bid amounts and content items not associated with bid amounts through a unified ranking is further described in U.S. patent application Ser. No. 13/545,266, filed on Jul. 10, 2012, which is hereby incorporated by reference in its entirety.

The content selection engine 230 receives a request to present a feed of content (e.g., a newsfeed or a story tray) to a user of the online system 140. The feed includes content items describing actions associated with other users connected to the user. The content selection engine 230 accesses one or more of the user profile store 305, the content store 210, the action log 320, and the edge store 225 to retrieve information about the user. For example, information describing actions associated with other users connected to the user or other data associated with users connected to the user are retrieved. Content items from the content store 210 are retrieved and analyzed by the content selection engine 230 to identify candidate content items eligible for presentation to the user. For example, content items associated with users who not connected to the user or stories associated with users for whom the user has less than a threshold affinity are discarded as candidate content items. Based on various criteria, the content selection engine 230 selects one or more of the content items identified as candidate content items for presentation to the identified user. The selected content items are included in a feed of content that is presented to the user. For example, the feed of content includes at least a threshold number of content items describing actions associated with users connected to the user via the online system 140.

In various embodiments, the content ranking engine 235 may determine the order in which selected content items are presented to a user. The ranking of the selected content items may be based on various ranking criteria. For example, the content ranking engine 235 ranks content items in the feed based on likelihoods of the user interacting with various content items. Additionally, or alternatively, the content selection engine 230 ranks content items based on their associated measures of relevance and selects content items having the highest positions in the ranking or having at least a threshold position in the ranking for presentation to the user. In one case, the content ranking engine 235 may rank item based on a discounted cumulative gain, which will be discussed in further detail below in association with FIGS. 4 and 5. The content ranking engine 235 determines the order of presentation of the content items and may sometimes determine whether a content item is to be displayed at all. For example, a content feed of a field of a GUI may only allow a certain number of content items to be presented while the content selection engine 230 has selected more than the maximum number of content items allowed. The content ranking engine 235 may first rank the items and the highest ranked items are displayed.

The online system 140 enforces one or more privacy settings of the users of the online system 140 in various embodiments. A privacy setting of a user determines how particular information associated with a user can be shared, and may be stored in the user profile of a user in the user profile store 205. In one embodiment, a privacy setting specifies particular information associated with a user and identifies other entities with whom the specified information may be shared or searchable. Examples of entities with which information can be shared may include other users, applications, third-party systems 130 or any entity that can potentially access the information. Examples of information that can be shared by a user include user profile information like profile photo, phone numbers associated with the user, user's connections video data including the user, actions taken by the user such as adding a connection, changing user profile information and the like. In various embodiments, the online system 140 maintains privacy settings associated with a user having a default setting preventing other entities from accessing or receiving content associated with the user, and allows the user to modify different privacy settings to allow other entities that are specified by the user to access or to retrieve content corresponding to the modified privacy settings.

The privacy setting may also allow users to determine whether actions of the users taken on the online system 140 may be monitored by the online system 140. For example, the online system 140 may monitor how users interact with and respond to others in the online system 140 such as the frequency of conversations between two users, endorsement of a content item by a user, etc. In one case that will be discussed in further detail below, the online system 140 may monitor how users interact with a certain ephemeral content item to improve the future selection and ranking of the content items. Users may choose to opt in or opt out of this feature. When users opt in the feature, the online system 140 may anonymize the actions and extract the data of the actions to use as an anonymous training set for the training of the content selection engine 230 and the content ranking engine 235.

The privacy setting specification may be provided at different levels of granularity. In one embodiment, a privacy setting may identify specific information to be shared with other users. For example, the privacy setting identifies a work phone number or a specific set of related information, such as personal information including profile photo, home phone number, and status. Alternatively, the privacy setting may apply to all the information associated with the user. Specification of the set of entities that can access particular information may also be specified at various levels of granularity. Various sets of entities with which information can be shared may include, for example, all users connected to the user, a set of users connected to the user, additional users connected to users connected to the user all applications, all third party systems 130, specific third-party systems 130, or all external systems.

The web server 240 links the online system 140 via the network 120 to the one or more client devices 110, as well as to the one or more third party systems 130. The web server 240 serves web pages, as well as other content, such as JAVA®, FLASH®, XML and so forth. The web server 240 may receive and route messages between the online system 140 and the client device 110, for example, instant messages, queued messages (e.g., email), text messages, short message service (SMS) messages, or messages sent using any other suitable messaging technique. A user may send a request to the web server 240 to upload information (e.g., images or videos) that are stored in the content store 210. Additionally, the web server 240 may provide application programming interface (API) functionality to send data directly to native client device operating systems, such as IOS®, ANDROID™, or BlackberryOS.

Graphical User Interface and Various Content Fields

Figure 3A:
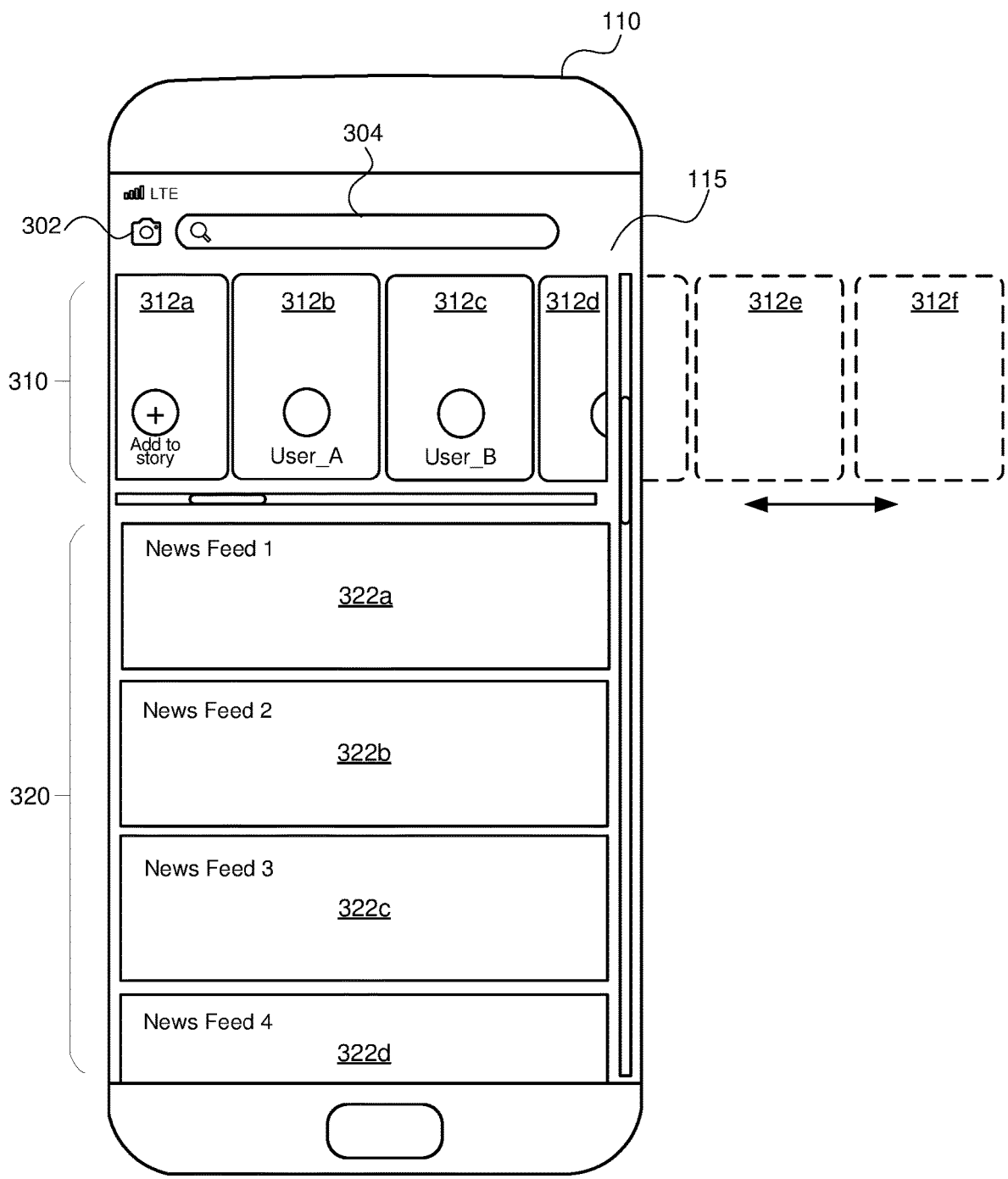
FIG. 3A illustrates a graphical user interface of an online system displayed at a client device, in accordance with an embodiment.

FIG. 3A is an example GUI 115 that is displayed at a client device 110 with a small screen, in accordance with an embodiment. An online system 140, in response to a request for a GUI 115, cooperates with the client device 110 to display the graphical elements and content items of the GUI 115. For example, in one case where the GUI 115 is the interface of the software application of the online system 140, certain graphical elements such as camera icon 302 and search bar icon 304 are pre-installed as part of the software application while items in the fields 310 and 320 are populated by the online system 140 when the software application is launched and/or refreshed. In another example where the GUI 115 is a website of the online system 140, both the graphical elements and the content items are provided by the online system 140 in response to an Internet protocol request, such as an HTTP request, sent from a browser application of the client device 110.

The GUI 115 includes several pre-defined areas that may be referred to as fields. Each field may include different functional elements and/or content items serving different purposes. For example, the GUI 115 may include an area that is reserved for camera icon 302 for a user to launch the camera of the client device 110. The GUI 115 may also include another area that is reserved for the search bar icon 304 for the user to perform a search within the online system 140. The GUI 115 may further include one or more content fields such as field 310 and field 320.

The fields 310 and 320 may include different types of content items and may each occupy a certain limited space in the GUI 115. For example, the field 310 may only occupy a top portion of the GUI 115 and include more content items 312 than the limited space can fit. For example, the field 310 initially can only display content items 312a, 312b, 312c, and partially 312d. Content items 312e and 312f are initially not displayed but a user may scroll left and right to see additional content items 312. Field 320 may occupy more space (despite still limited) of the GUI 115 and include various new feeds 322 as the user scroll up and down of the field 320. In the example shown in FIG. 3A, the field 310 is scrollable in a first direction (e.g. horizontally) of the client device 110 while the second field 320 for display of news feed 322 is scrollable in a second direction (e.g., vertically) of the client device 110 that is different from the first direction. In one case, the two directions are perpendicular to each other. However, in other arrangements, the two fields may be scrollable in the same or similar direction.

Each field may include a plurality of pre-defined areas of fixed or variable sizes that may be referred to as slots. Each slot may be used to display a content item or a graphical element. For example, in the field 310, each slot is a rectangular space that is used to display a graphical element or a content item. Some slots may be reserved for certain graphical elements that provide functionality to the GUI 115 and/or that are common among the GUIs 115 of different client devices. For instance, the first (leftmost) slot of the field 310 may be reserved for the graphical element 312a "Add to story" that allows the user to create a new ephemeral content item. Other slots are used for display of various content items such as ephemeral content items 312b and 312c that are created respectively by User_A and User_B. In one case, some slots may be reserved for a particular type of content items. For example, every fourth slot of the field 310 may be reserved for sponsored content items.

The size, arrangement, areas, sub-elements of the two fields 310 and 320 shown in FIG. 3A are for illustration only. Other embodiments of the GUI 115 may include fewer or additional fields that occupy different areas of the GUI 115 in different arrangements. Not all fields are associated with displaying content items. Other fields may be used for displaying other graphical elements. Some fields may not be scrollable. Also, some fields may include slots of fixed size while others include slots of variable sizes. Some fields are not operated based on slot allocation. In some embodiments, the fields' size and position may be customizable by the user.

Different fields in the GUI 115 may be used for display of different types of content items. For example, in the particular example shown in FIG. 3A, the field 310 may be referred to as a story tray 310 or a story field 310 that is used for display of ephemeral content items while the field 320 may be referred to as a news feed 320 that is used for display of other content items that may not necessarily be ephemeral in nature.

The story tray 310 includes ephemeral content items 312 that may be referred to as "stories." The ephemeral content items 312 are usually content items that are created by users within a threshold time period (e.g., with 24 hours). The ephemeral content items 312 are eligible for display in story trays 310 of other users for a duration of time that does not exceed the threshold time period. Afterward, the ephemeral content items 312 are no longer eligible for display in any story trays 310 and will also be removed from the story trays 310 that have displayed the items. In some embodiments, the expired ephemeral content items 312 are archived in the creator's profile and is only retrievable by the creator but not other users of the online system 140. The expired ephemeral content items 312 are normally not allowed to be searched, retrieved, or displayed by users other than the creator. Since the ephemeral content items 312 often contain the most updated and recent stories of other users but are only displayed for a limited period of time, the ephemeral content items 312 are featured prominently in the GUI 115 (e.g., at the top portion of the GUI 115). Also, because the stories are time-limited, an accurate ranking of the ephemeral content items should be done quickly to ensure that stories are viewed by the right users. The ranking of the ephemeral content items will be discussed in further detail below in association with FIGS. 4 and 5.

Figure 3B:
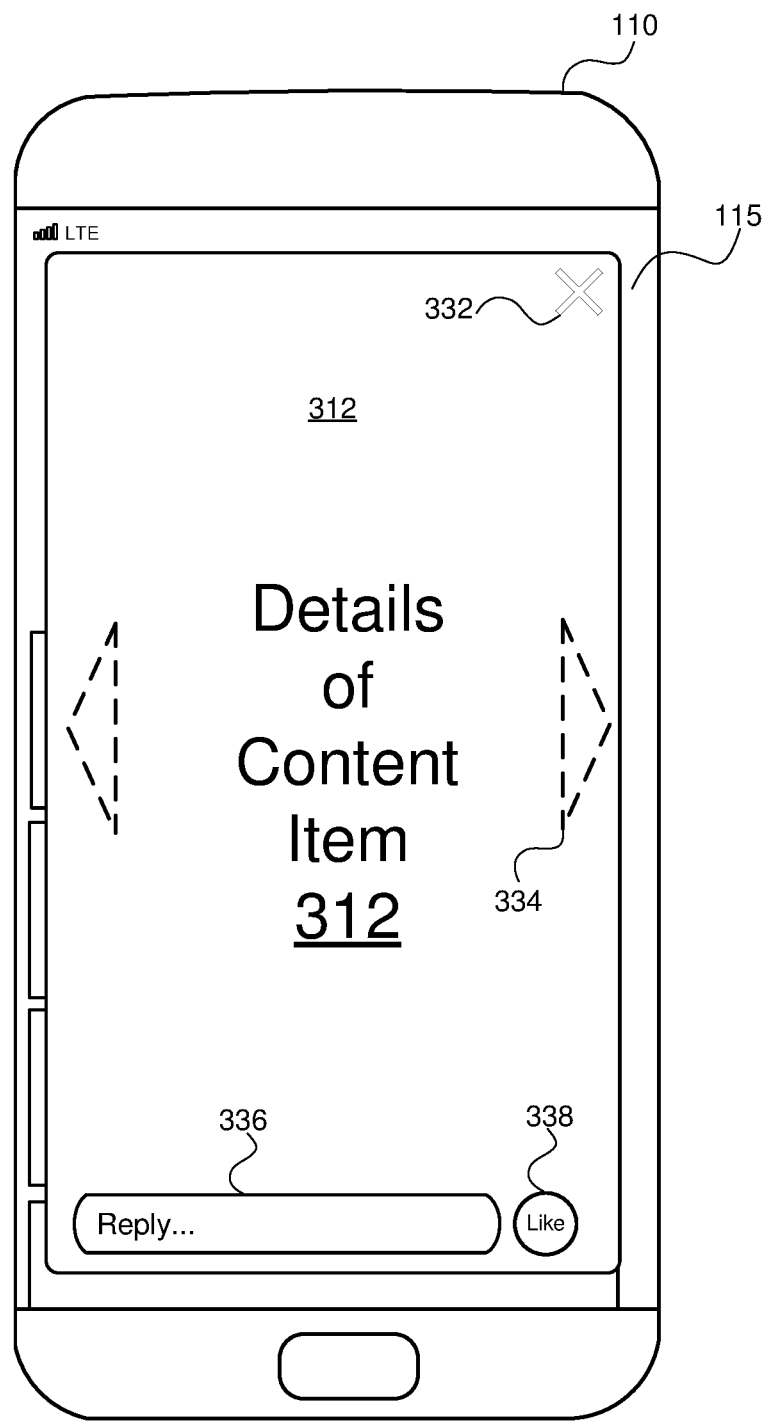
FIG. 3B illustrates an expanded content item displayed at the graphical user interface shown in FIG. 3B, in accordance with an embodiment.

In addition to displaying the content items, the GUI 115 allows users to respond and react to the displayed content items. By way of example of the story tray 310, users may take different actions with respect to the ephemeral content items 312. Referring to FIG. 3A, when the GUI 115 first displays the story tray 310, the story tray 310 occupies only a top portion of the GUI 115. A user can scroll horizontally to browse different ephemeral content items. When the user finds an ephemeral content item 312 of interest, a user may tap on (click on) the item. In response, the online system 140 causes the GUI 115 to expand the area of the tapped content item 312. Referring to FIG. 3B, the detail of the ephemeral content item 312 may expand from the limited space of the story tray 310 to overlay a significant area of the GUI 115 (in one case substantially the entire area of the GUI 115). After an ephemeral content item 312 is expanded, the expanded area may remain until the user selects the close button 322 that is represented by a cross. The user may continue to tap the direction icon 334 or swipe horizontally to browse different ephemeral content items 312. In some embodiments, the GUI 115 may also include a timer that allows the GUI 115 to automatically present the next ephemeral content item 312 after the current ephemeral content item 312 is displayed for a short period of time (e.g., 20 seconds). This feature may also be referred to as an auto-play feature.

The users may also take other actions with respect to an ephemeral content item 312. First, the users may choose to reply to the content item using the text entry box 336. Second, the users may choose to endorse the item by selecting the endorsement button 338. There can be different types of endorsement, including "like," smiling face, etc. Third, the users may choose to create their own ephemeral content item, for example, by selecting the "Add to story" button at the graphical element 312a shown in FIG. 3A. After the user finishes browsing the ephemeral content items, the user may choose to exit the expanded form by clicking the exit button 332. In response, the GUI 115 returns to the layout shown in FIG. 3A and the user may continue to browse other fields of the GUI 115.

The population of a field in the GUI 115 is usually controlled by the online system 140. Specifically, in one embodiment, after the GUI 115 is initially launched or sometimes is refreshed, a request for a session to display content items in a field is sent to the online system 140. For story tray 310, the online system 140, in turn, creates a session identifier associated with the request and selects a set of ephemeral content items for the session. To be eligible for selection, each ephemeral content item is created within a threshold time period from the request for the session. After the set of ephemeral content items is selected, the online system 140 ranks the content items by order and causes the GUI 115 to display the sorted content items in accordance with the rank. The online system 140 associates the session identifier with the set of ephemeral content items selected and ranked. After the ephemeral content items are displayed, the online system 140 may monitor the user's actions taken on the items in the set associated with the session, such as tapping, closing, replying, endorsing, and creating user's own content. When a request for a session to display content items in the story tray 310 is sent another time, the online system 140 creates another session identifier and repeats the selection, ranking, and monitoring process. Hence, each session identifier is associated with a set of a plurality of ephemeral content items and records of user actions taken on the content items. Each set that includes multiple ephemeral content items is associated with a unique session identifier and may be used as a training set for the training of the selection and ranking engines of the online system 140.

Training of Ranking Model

The online system 140 includes a computer model 400 to rank ephemeral content items that are eligible for display in the story tray 310. The computer model 400 may be a machine learning model that is trained based on a plurality of sample sets (training sets) 410. Each sample set 410 is a past session of a story tray 310 that is displayed at a client device 110. In one embodiment, instead of using an individual ephemeral content item as a sample set 410, each sample set 410 may include the entire past session that had a plurality of ephemeral content items that were previously displayed at a client device 110. In other words, a single ephemeral content item may be included in different sample sets because the item was selected to display in different sessions. Here, an entire past session may refer to a collection of most past content items in a session. However, an entire past session should not be construed as having to require that all of the past content items in the session must be included. In generating a training sample set, a few content items may be removed from the session but the collection can still be considered as an entire past session. Each sample set 410 of a past session may be identified by the session identifier. The sample set 410 includes actions taken (if any) by the users associated with the sample set during the past session.

The online system 140 generates the sample sets 410 by associating a past session with a session identifier. For each sample set, the online system 140 identifies a past session associated with a past presentation of a ranked set of past ephemeral content items to a user. For example, when a story tray 310 shown in FIG. 3A is presented to a user, the online system 140 stores the session identifier and monitors the user actions taken on the content items and uses the data in the future on an additional sample set. The online system 140 also records the past user actions performed on the past content items by the user.

For each past content item in a sample set 410, the online system assigns a relevance label representing the past user action performed on the past content item. The relevance label assignment is based on the type of user action performed. The more desirable (e.g., actions that promote user interactions of the online system 140) the user action is, a higher numerical score is the relevance label. For example, possible user actions include tapping an ephemeral content item to cause the story tray 310 in GUI 115 to change to the expanded form shown in FIG. 3B, viewing an ephemeral content item for a threshold amount of time, allowing an ephemeral content item to display until the auto-play feature changes the GUI 115 to another item, responding to an ephemeral content item, endorsing an ephemeral content item, sharing an ephemeral content item, creating a new ephemeral content item after viewing other items, and intentionally closing the ephemeral content item (clicking the close button 332 in FIG. 3B).

Referring to an example sample 410 shown in FIG. 4, different user actions may be assigned different relevance labels. For example, closing an ephemeral content item may be considered as the least desirable action in the online system 140. A relevance label 0 is assigned as a result. Tapping an ephemeral content item or viewing an ephemeral content item may be considered as a neutral or slightly positive user action. As a result, relevance labels 1 and 2 are respectively assigned to past content item 4 and past content item 2. Tapping is considered a more desirable action than viewing because tapping causes the story tray 310 of limited space to expand to cover a large area of the GUI 115. This might indicate the viewing user is more interested in the ephemeral content item tapped. Replying to the ephemeral content item and creating a new ephemeral content item after viewing a past content item are considered the most desirable user actions. Hence, relevance labels 3 and 4 are respectively assigned to past content item 5 and past content item 3. While only five types of user actions are shown in this particular example, other user actions are also possible. For example, endorsing an ephemeral content item may be assigned a relevance label that is similar to replying or a label that is slightly lower than replying but higher than tapping. More or fewer than five relevance labels are also possible. Also, in some cases, when no user action is performed on a particular content item, the content item is assigned no relevance label or with a relevance label that has a neutral score.

Based on the relevance label assigned, the online system 140 determines a position gain score for each of the past content item. The position gain score represents a position gain when a past content item associated with a higher relevance label is ranked higher in the list. In one embodiment, the position gain score is based solely on the relevance label. In other embodiments, the online system 140 may also take other factors into consideration when converting the relevance score into a position gain score. For example, the online system 140 may take the natures (e.g., whether the content item is a video, photo, or text) and attributes (e.g., how the content item is related to the viewing users, how long the creator took to create the content item, an estimated quality of the content item, etc.) into consideration when converting the relevance label to the position gain score. In one specific case, the position gain score is a function of the relevance label that is defined by the following Equation (1).

$$\text{Gain} = 2^{Relevance\_Label} - 1 \quad \text{(Eq. 1)}$$

For example, in the specific example of sample set 410, since past content item 1 is associated with a relevance label of 2, the position gain score based on Equation 1 is 3. Likewise, the position gain score of the past content item 3 is 15.

The online system, in generating a sample set associated with a past session, may also analyze the attributes of each content item in the session to assign different values that represent the attributes of the content item. A single content item may be associated with different attributes. For example, the type of content item (whether it is a video, picture, or text) may be an attribute. The affinity (how closely related the creator and the viewing user) of the content item may also be an attribute. Other attributes may also include the popularity of the creator in the online system 140, topics of the content item (a friend's story, story related to food, movies, video games, etc.), historical interaction between the creator and viewing user, historical interaction between the viewing user and a similar content item, elements in the content items (whether people are included in the content), etc. In some cases, the time spent on creating the content item, which may have a correlation with the quality of the content item, may also be an attribute of the content items. In the case of sponsored content items, the bid amount and target criteria of the content item may also be considered attributes. Each attribute may be quantified and converted to a numerical value. For example, based on past conversations and interactions between the creator of the content item and the viewing user, the affinity attribute of a content item may be scaled to a numerical range from 0 to 10. After each attribute is converted to a numerical value, the content item in the sample set 410 may be represented by a vector with some of the dimensions of the vector representing the numerical representation of the attributes of the content item.

After an entire past session is analyzed and position gain scores are assigned to the content items, the entire past session is used as a single sample set. By repeating the analysis, the online system 140 generates a plurality of sample sets based on different past sessions.

Since the past session that includes multiple past content items is used as a sample set instead of each individual content item being treated as a training sample, the computer model 400 has an improved performance over other training methods. First, because the story tray 310 occupies a limited area of the GUI 115 initially and occupies substantially the entirety of the GUI 115 when expanded, viewing users often treat the session of ephemeral content items as a whole. Hence, training the computer model using sessions as sample sets is more consistent with the perspective of the viewing users. Second, the training method described in this disclosure allows the learning from pairwise preference (e.g., content item A is more relevant than content item B for a viewing user). Hence, the training method directly optimizes the ranked order of content items for each viewing user because content items are compared with other content items in the same session to determine pairwise preference. Third, the training method described in this disclosure ensures an equal optimization across different viewers because viewers contribute equally to the optimization. This avoids over-fitting for viewing users that are paired with too many content items. Fourth, because the discounted cumulative gain is used for training of the computer model, different relevance values can be assigned to different actions that are more consistent than a binary assignment of relevancy. The training method allows an automatic assignment of relevance labels to the content items without manual assignments by humans.

Figure 5:
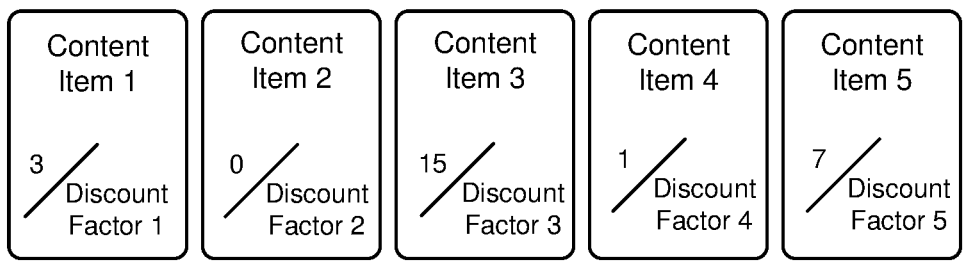
FIG. 5 illustrates the determination of normalized discounted cumulative gain of a ranked order, in accordance with an embodiment.
Figure 5:
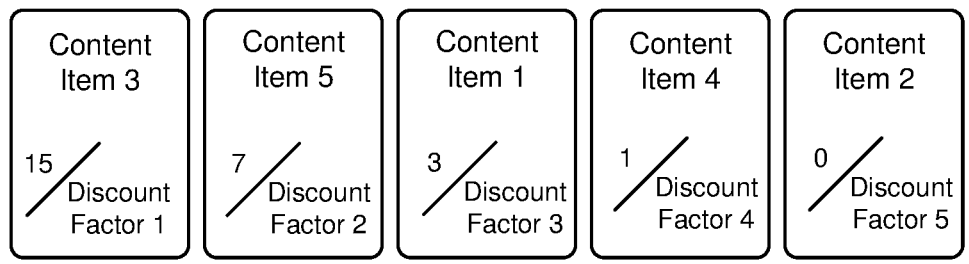

FIG. 5 illustrates a determination of a ranking performance of the computer model 400 using a metric which may be referred to as normalized discounted cumulative gain (NDCG). Given a sample set associated with a past session having a plurality of past content items, each content item is assigned a position gain score, as discussed in FIG. 4. The computer model 400 analyzes the attributes of the content items and propose to a ranked order of the past session. Based on the ranked order, an NDCG can be determined. The determination of NDCG involves summing of each position gain score of the content item discounted by a discounted factor that is based on the position of the content item in the proposed ranked order. The summation of those discounted position gain scores is referred to as a discounted cumulative gain (DCG). After the DCG is determined, the DCG is normalized by an optimal DCG, which represents a ranked order of the given session that will result in the highest DCG. Since the DCG is normalized, the NDCG is in the range of 0 and 1 with 1 representing that the proposed ranked order achieving an optimal rank performance defined by the past user actions performed on the content items during the session.

By way of example, a ranked list 510 in FIG. 5 illustrates a ranked order proposed by the computer model 400 based on the analysis of the attributes of each content item in the sample set. The content items on the left represent items that are first displayed in a content field of a GUI 115 while the content items on the right represent items that are displayed last. This ranked list 510 is evaluated and compared with the actual past user actions performed on the set of content items to determine how the computer model 400 performs in terms of ranking past sessions of content items.

The evaluation of the performance of the computer model 400 is carried out by determining the NDCG of the ranked list 510. In the ranked list 510, the proposed ranked order is simply past content item 1>item 2>item 3>item 4>item 5. Each past content item is associated with a position gain score that is determined by the past user action performed on the content item. For example, the content item 1 is associated with a position gain score of 3 (which might correspond to the user tapping the content item 1 in a past session), the content item 2 is associated with a position gain score of 0 (which might correspond to the user intentionally closing the expanded content item in the GUI 115 in the past session), the content item 3 is associated with a position gain score of 15 (which might correspond to the user creating a new content item after viewing item 3 in the past session), etc. The computer model 400 discounts the position gain score of each content item by a position discount factor that increases as the content item in the proposed ranked order is ranked lower compared to other content items. Various different forms of discount factors are possible and how the discount factors are determined may depend on implementations. In one case, the position discount factor is simply the position number. In other words, the position gain score is divided by the position number to get the discounted gain. In another case, the position discount factor is based on the logarithm of the position number. For example, the position discount factor is log 2(1+1), where i is the position number. In the ranked list 510, the position gain score of 3 of the content item 1 is discounted by the first discount factor, which is log 2(1+1)=1. Hence, the discounted gain for the content item 1 is 3/1=1. For content item 2, since its position gain score is 0, the discounted gain score is also 0. The position gain score of 15 of the content item 3 is discounted by the third discount factor, which is log 2(3+1)=2. Hence, the discounted gain for the content item 3 is 15/3=5.

After each of the gain scores in the proposed ranked list is discounted by the position, the computer model 400 determines a sum of the discounted position gain scores. This sum is the discounted cumulative gain (DCG). For example, when the logarithm version of position discount factor is used, the DCG from the first position to the p-th position can be determined by equation (2) below.

$$DCG = \sum_{i=1}^{p} \frac{Gain_i}{\log_2(i+1)} \quad \text{(Eq. 2)}$$

In equation (2), $Gain_i$ is the position gain score of the content item ranked at the i-th position.

After DCG is determined, the computer model 400 determines an ideal DCG (IDCG) for a given session that is associated with the plurality of content items. IDCG represents an optimal ranked order that results in a maximum sum of the position gain scores that are discounted by positions determined by the optimal rank given the set of content items each having a position gain score that is determined by a past user action. For example, an optimal ranked list is shown in the ranked list 520 in FIG. 5. In the ranked list 520, content items having the highest position gain scores (e.g., content items 3 and 5) are ranked higher than other content items that have lower position gain scores. Since the discount factors increase with the position number, the content items that are ranked high are discounted the least. As a result, the DCG of the ranked list 520 is higher than the DCG of ranked list 510. After the IDCG is determined, the computer model 400 normalizes the DCG of the ranked list 510 based on the IDCG to determine the NDCG. Since IDCG represents the maximum DCG for a given session, the NDCG ranges from 0 to 1. A value for a sample set that is close to 1 represents that the computer model 400, based on its ranking algorithm that analyzes the attributes of each content items, successfully ranks a set of content items in an order that is close to the actual user actions performed on the content items. A value for another sample set that is close to 0 represents that the computer model 400, based on its ranking algorithm that analyzes the attributes of each content items, is unable to rank a set of content items in an order that is consistent with the actual user actions performed on the content items. As such, the ranking algorithm may need to be re-adjusted.

The computer model 400 is a computer learned model that may be used to rank ephemeral content items in a story tray for a particular session. The training of the computer learned model 400 includes generating the sample sets. As discussed above, each sample set may be associated with an entire past session and each past content item in a sample set has a position gain score that is determined in accordance with the past user action performed on the past content item. The training of the computer model 400 also includes determining discounted cumulative gains of proposed ranked orders of the sample sets that are proposed by the computer model 400 based on the position gain scores assigned to the content items. The training of the computer model 400 further includes adjusting the computer model to adjust the proposed ranked orders of the sample sets to increase at least some of the discounted cumulative gains of the adjusted proposed ranked orders.

The adjustment of the computer model 400 may use NDCG as a metric for optimization. The computer model 400 can be based on different machine learning model. In one embodiment, the computer model 400 includes boosted gradient decision trees as the ranking algorithm that optimizes for the average NDCG. A number of small decision trees (e.g., with five leaves per tree) with boosting. A content item's rank score is the sum of the trees' scores for the story. Each tree determines the score of the content item based on certain attributes of the content item. After each content item is scored, a ranked list can be proposed based on the scores. In another embodiment, the ranking algorithm of the computer model 400 may be a weights model. In other words, how important a type of attribute is for a content item in terms of ranking the content item may be associated with a weight. When a sample set is fed to the computer model 400, the computer model proposed a ranked list and determines the NDCG of the ranked list. Based on the NDCG, the computer model adjusts the decision trees or the weights associated with different types of attributes in order to increase the overall NDCG. A goal of the training may be to maximize the overall NDCG values across different sample sets (e.g., to maximize the average NDCG). The adjustment may continue for different sample sets until the computer model 400 converges (e.g., the average NDCG reaches a maximum and no longer improves for additional sample sets) or until the computer model's ranking performance exceeds a threshold score (e.g., the average NDCG is above a threshold, e.g., 0.8). The adjusted computer model is a computer learned model that can be used to rank content items in response to a request to display, for example, a new session of ephemeral content items.

Ranking Process

Figure 6:
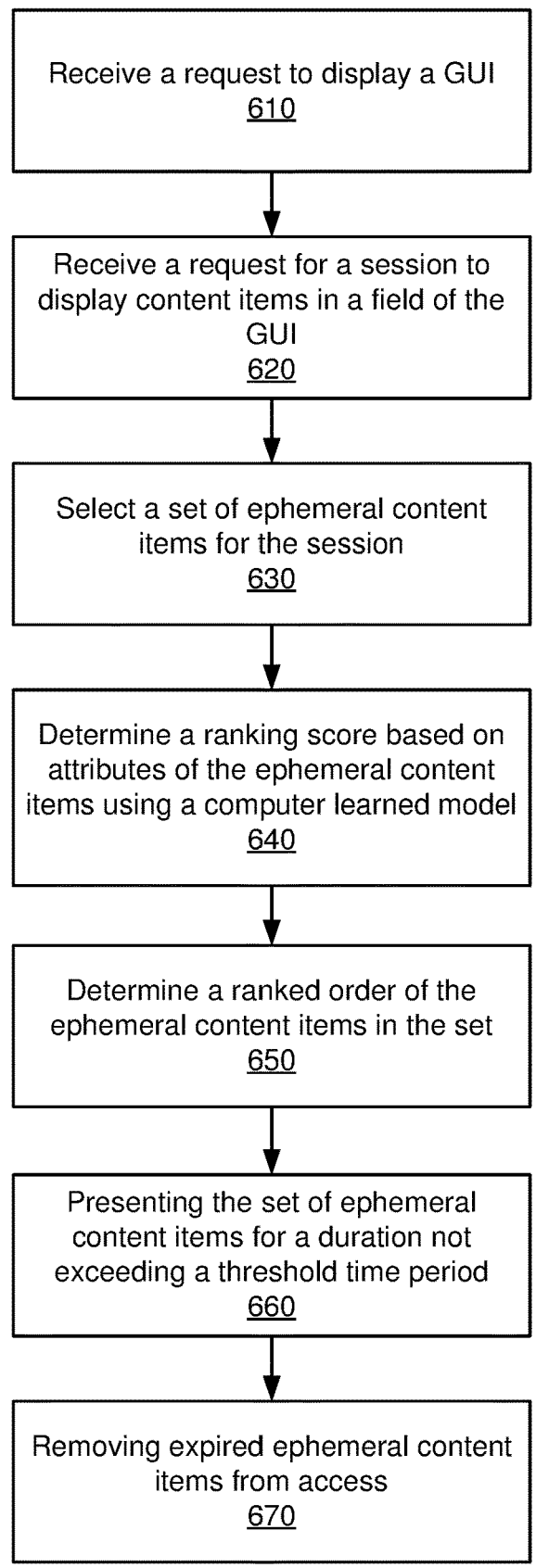
FIG. 6 illustrates a flowchart of a process for selecting and ranking ephemeral content items for display, in accordance with an embodiment.

FIG. 6 illustrates a flowchart depicting a process for displaying and ranking ephemeral content items, in accordance with an embodiment. An online system receives 610 a request to display a GUI of at a client device. In one embodiment, the graphical user interface includes a story field of a limited space for holding content items. The online system receives 620 a request for a session to display content items in the story. The request may be sent from the GUI when the GUI is launched or when the GUI is refreshed.

In response, the online system selects 630 a set of ephemeral content items for the session and may assign the session with a session identifier. The ephemeral content items eligible for selection are created within a threshold time period from the request. In one case, the threshold time period is 24 hours. The selection of the set of ephemeral content items for the session may include identifying candidate ephemeral content items that are eligible for selection. In turn, the online system determines, for each identified candidate ephemeral content item, a score in accordance with attributes of the identified candidate ephemeral content items. For example, a content item whose creator has a high affinity with the viewing user is scored higher than another content whose creator is not connected to the viewing user. The online system then selects the candidate ephemeral content items whose scores are above a threshold score.

In turn, the online system determines 640, for each ephemeral content item in the set, a ranking score based on attributes of the ephemeral content item using a computer learned model that is trained with sample sets to optimize overall discounted cumulative gains of the sample sets. The computer learned model may correspond to the computer model 400 and the training of the model is discussed in detail in association with FIGS. 4 and 5. In one embodiment, instead of using an individual content item as a sample set, each sample set is an entire past session that was displayed to a user of the social networking system. The past user may or may not be the current viewing using. The past session includes a plurality of past content items. Each past content item in the sample set has a relevance label that represents a past user action performed on the past content item. For example, the user replying to the content item results in a relevance label of a higher value when such user action is recorded. Each discounted cumulative gain of each sample set is based on the relevance label and a ranked order of the entire past session of the sample set. For example, the relevance label is converted to a position gain score and the discounted cumulative gain is based on the sum of the gain score discounted by the positions in a proposed ranked order.

The determination of the ranking score of each ephemeral content item in the current set to be ranked may depend on the type of computer learned model. In one embodiment, the computer learned model includes a plurality of boosted gradient trees. The computer model provides the ephemeral content item to be scored to each of the plurality of boosted gradient trees to analyze one or more attributes of the ephemeral content item. Each boosted gradient tree of the computer model generates a score based on the attributes of the ephemeral content items. The computer model then sums the different scores of different boosted gradient trees to determine the ranking score. In another embodiment, the computer model is a weights model that determines the ranking score based on a combination of weighted scores of different types of attributes. For example, based on the attributes of the content item, the content item might be converted into a vector. The values of the vectors are multiplied by the weighted factors in the model. The overall ranking score of the content item is a combination, linear or non-linear, of various weights.

After a ranking score is determined, the online system determines 650 a ranked order of the ephemeral content items in the set in accordance with the ranking score of each ephemeral content item. The online system, in turn, presents 660 the set of ephemeral content items in the story field of the graphical user interface in the ranked order for a duration of the session not exceeding the threshold time period. The online system removes 670 expired ephemeral content items from the access of users other than the creator. An expired ephemeral content item is an ephemeral content item that is created before the threshold time period and expired after the threshold time period. The removing of the expired ephemeral content item from access prevents the other users from searching or retrieving the expired ephemeral content item that was previously displayed in the story field of the graphical user interface during the threshold time period. Also, the online system archives the expired ephemeral content item at an archive store associated with a creator of the expired ephemeral content item.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a non-transitory computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A computer-implemented method, comprising:
   receiving a request to display a graphical user interface of a social networking system at a mobile device associated with a target user, the graphical user interface comprising a story field of a limited space for holding content items;
   receiving a request for a session to display content items in the story field, the session being a current session;
   selecting a set of ephemeral content items for the session, each selected ephemeral content item created within a threshold time period from the request, each selected ephemeral content item associated with a set of attributes, at least one of the attributes for the each ephemeral content item in the current session having a value that is dependent on the target user;
   determining, for each selected ephemeral content item in the set, a ranking score based on the set of attributes using a computer learned model that is trained with sample sets, the computer learned model trained to rank content items using the set of attributes relative to other users of the social networking system, wherein training of the computer learned model comprises:
      retrieving past sessions of past ephemeral content items as the sample sets, each past session being treated as a separate sample set, the past ephemeral content items removed from access in the current session, the past ephemeral content items associated with the set of attributes,
      assigning, for each past ephemeral content item in each past session, a relevance label according to a past user action performed on the past ephemeral content item within the past session, each past session being treated as the separate sample set in assigning the relevance label,
      generating, for at least one of the past sessions, a proposed order of the past ephemeral content items in that past session, the proposed order generated based on the set of attributes relative to the other users of the social networking system,
      determining discounted cumulative gains of the past sessions based on the relevance label for each past ephemeral content item in the proposed order, and
      adjusting the computer learned model to improve discounted cumulative gains of the past sessions;
   determining a ranked order of the ephemeral content items in the set in accordance with the ranking score of each ephemeral content item; and
   presenting the set of ephemeral content items in the story field of the graphical user interface in the ranked order for a duration of the session not exceeding the threshold time period.

2. The computer-implemented method of claim 1, wherein the graphical user interface comprises a second field for display of a news feed, and the story field for display of the set of ephemeral content items is scrollable in a first direction of the mobile device while the second field for display of the news feed is scrollable in a second direction of the mobile device different from the first direction.

3. The computer-implemented method of claim 1, wherein training of the computer learned model further comprises:
   determining a position gain score for each of the past ephemeral content items in each of the sample sets in accordance with the relevance label of the past ephemeral content item;
   determining, based on the position gain scores of the content items, the discounted cumulative gains of proposed ranked orders of the sample sets that are proposed by a computer model; and
   adjusting the computer model to adjust the proposed ranked orders of the sample sets to increase at least some of the discounted cumulative gains of the adjusted proposed ranked orders, wherein the adjusted computer model is the computer learned model.

4. The computer-implemented method of claim 3, wherein determining the discounted cumulative gains of the proposed ranked orders of sample sets comprises:
   for each proposed ranked order of a sample set:
      discounting the position gain score of each past ephemeral content item by a position discount factor that increases as the past ephemeral content item in the proposed ranked order is ranked low compared to other past ephemeral content items;
      determining a sum of the position gain scores that are discounted;
      determining an ideal discounted cumulative gain, the ideal discounted cumulative gain representing an optimal ranked order that results in a maximum sum of the position gain scores that are discounted by positions determined by the optimal rank; and
   normalizing the sum of the gain scores based on the ideal discounted cumulative gain.

5. The computer-implemented method of claim 1, wherein training of the computer learned model further comprises:
   for each sample set:
      identifying a particular past session associated with a particular past presentation of a ranked set of past ephemeral content items to a particular user;
      recording the past user actions performed on the past ephemeral content items by the particular user;

assigning, for each past ephemeral content item, the relevance label representing the past user action performed on the past content item;
determining, for each past content item, a position gain score for the past ephemeral content item based on the relevance label; and
using the particular past session whose past ephemeral content items are assigned the gain scores as the sample set.

6. The computer-implemented method of claim 1, wherein the attributes of each ephemeral content items comprise one or more of: type of the ephemeral content item, affinity score of the ephemeral content item associated with a viewing user, length of creation of the ephemeral content item, historical interaction between a viewing user and a creating user, and/or content included in the ephemeral content item.

7. The computer-implemented method of claim 1, wherein choices of the relevance label comprise one or more of: tapping a past content item, viewing a past content item, endorsing a past content item, closing a past content item, replying a past content item, sharing a past content item, and/or creating a past content item.

8. The computer-implemented method of claim 1, wherein selecting the set of ephemeral content items for the session comprises:
identifying candidate ephemeral content items;
determining, for each identified candidate ephemeral content item, a score in accordance with the attributes of the identified candidate ephemeral content items; and
selecting the candidate ephemeral content items whose scores are above a threshold score.

9. The computer-implemented method of claim 1, wherein the computer trained model comprises a plurality of boosted gradient trees, and wherein determining, for each ephemeral content item in the set, the ranking score based on the set of attributes using the computer learned model comprises:
providing the ephemeral content item to each of the plurality of boosted gradient trees that analyze one or more attributes of the ephemeral content item;
generating a score for each of the boosted gradient trees based on the attributes of the ephemeral content items; and
summing different scores of different boosted gradient trees to determine the ranking score.

10. The computer-implemented method of claim 1, further comprising:
archiving an expired ephemeral content item at an archive store associated with a creator of the expired ephemeral content item, the expired ephemeral content item being a particular ephemeral content item created before the threshold time period and expired after the threshold time period; and
removing the expired ephemeral content item from access by other users of the social networking system other than the creator, the removing of the expired ephemeral content item from access prevents the other users from retrieving the expired ephemeral content item that was previously displayed in the story field of the graphical user interface during the threshold time period.

11. A non-transitory computer-readable medium storing computer program code comprising instructions that, when executed, cause one or more processors to:
receive a request to display a graphical user interface of a social networking system at a mobile device associated with a target user, the graphical user interface comprising a story field of a limited space for holding content items;
receive a request for a session to display content items in the story field, the session being a current session;
select a set of ephemeral content items for the session, each selected ephemeral content item created within a threshold time period from the request, each selected ephemeral content item associated with a set of attributes, at least one of the attributes for the each ephemeral content item in the current session having a value that is dependent on the target user;
determine, for each selected ephemeral content item in the set, a ranking score based on the set of attributes using a computer learned model that is trained with sample sets, the computer learned model trained to rank content items using the set of attributes relative to other users of the social networking system, wherein training of the computer learned model comprises:
retrieving past sessions of past ephemeral content items as the sample sets, each past session being treated as a separate sample set, the past ephemeral content items removed from access in the current session, the past ephemeral content items associated with the set of attributes,
assigning, for each past ephemeral content item in each past session, a relevance label according to a past user action performed on the past ephemeral content item within the past session, each past session being treated as the separate sample set in assigning the relevance label,
generating, for at least one of the past sessions, a proposed order of the past ephemeral content items in that past session, the proposed order generated based on the set of attributes relative to the other users of the social networking system,
determining discounted cumulative gains of the past sessions based on the relevance label for each past ephemeral content item in the proposed order, and
adjusting the computer learned model to improve discounted cumulative gains of the past sessions;
determine a ranked order of the ephemeral content items in the set in accordance with the ranking score of each ephemeral content item; and
present the set of ephemeral content items in the story field of the graphical user interface in the ranked order for a duration of the session not exceeding the threshold time period.

12. The non-transitory computer-readable medium of claim 11, wherein the graphical user interface comprises a second field for display of a news feed, and the story field for display of the set of ephemeral content items is scrollable in a first direction of the mobile device while the second field for display of the news feed is scrollable in a second direction of the mobile device different from the first direction.

13. The non-transitory computer-readable medium of claim 11, wherein training of the computer learned model further comprises:
determine a position gain score for each of the past ephemeral content items in each of the sample sets in accordance with the relevance label of the ephemeral past content item;
determine, based on the position gain scores of the content items, the discounted cumulative gains of proposed ranked orders of the sample sets that are proposed by a computer model; and adjust the computer model to adjust the proposed ranked orders of the sample sets to increase at least some of the discounted cumulative gains of the adjusted proposed ranked orders, wherein the adjusted computer model is the computer learned model.

14. The non-transitory computer-readable medium of claim 13, wherein determine the discounted cumulative gains of the proposed ranked orders of sample sets comprises:

for each proposed ranked order of a sample set:
discount the position gain score of each past ephemeral content item by a position discount factor that increases as the past ephemeral content item in the proposed ranked order is ranked low compared to other past ephemeral content items;
determine a sum of the position gain scores that are discounted;
determine an ideal discounted cumulative gain, the ideal discounted cumulative gain representing an optimal ranked order that results in a maximum sum of the position gain scores that are discounted by positions determined by the optimal rank; and
normalize the sum of the gain scores based on the ideal discounted cumulative gain.

15. The non-transitory computer-readable medium of claim 11, wherein training of the computer learned model further comprises:

for each sample set:
identify a particular past session associated with a particular past presentation of a ranked set of past ephemeral content items to a particular user;
record the past user actions performed on the past ephemeral content items by the particular user;
assign, for each past ephemeral content item, the relevance label representing the past user action performed on the past content item;
determine, for each past content item, a position gain score for the past ephemeral content item based on the relevance label; and
use the particular past session whose past ephemeral content items are assigned the gain scores as the sample set.

16. The non-transitory computer-readable medium of claim 11, wherein the attributes of each ephemeral content items comprise one or more of: type of the ephemeral content item, affinity score of the ephemeral content item associated with a viewing user, length of creation of the ephemeral content item, historical interaction between a viewing user and a creating user, and/or content included in the ephemeral content item.

17. The non-transitory computer-readable medium of claim 11, wherein choices of the relevance label that represents the past user action comprise one or more of: tapping a past content item, viewing a past content item, endorsing a past content item, closing a past content item, replying a past content item, sharing a past content item, and/or creating a past content item.

18. The non-transitory computer-readable medium of claim 11, wherein select the set of ephemeral content items for the session comprises:

identify candidate ephemeral content items;
determine, for each identified candidate ephemeral content item, a score in accordance with the attributes of the identified candidate ephemeral content items; and
select the candidate ephemeral content items whose scores are above a threshold score.

19. The non-transitory computer-readable medium of claim 11, wherein the computer trained model comprises a plurality of boosted gradient trees, and wherein determine, for each ephemeral content item in the set, the ranking score based on the set of attributes using the computer learned model comprises:

provide the ephemeral content item to each of the plurality of boosted gradient trees that analyze one or more attributes of the ephemeral content item;
generate a score for each of the boosted gradient trees based on the attributes of the ephemeral content items; and
sum different scores of different boosted gradient trees to determine the ranking score.

20. The non-transitory computer-readable medium of claim 11, wherein the instructions further cause the one or more processors to:

archive an expired ephemeral content item at an archive store associated with a creator of the expired ephemeral content item, the expired ephemeral content item being a particular ephemeral content item created before the threshold time period and expired after the threshold time period; and
remove the expired ephemeral content item from access by other users of the social networking system other than the creator, the removing of the expired ephemeral content item from access prevents the other users from retrieving the expired ephemeral content item that was previously displayed in the story field of the graphical user interface during the threshold time period.

* * * * *